UNITED STATES PATENT OFFICE.

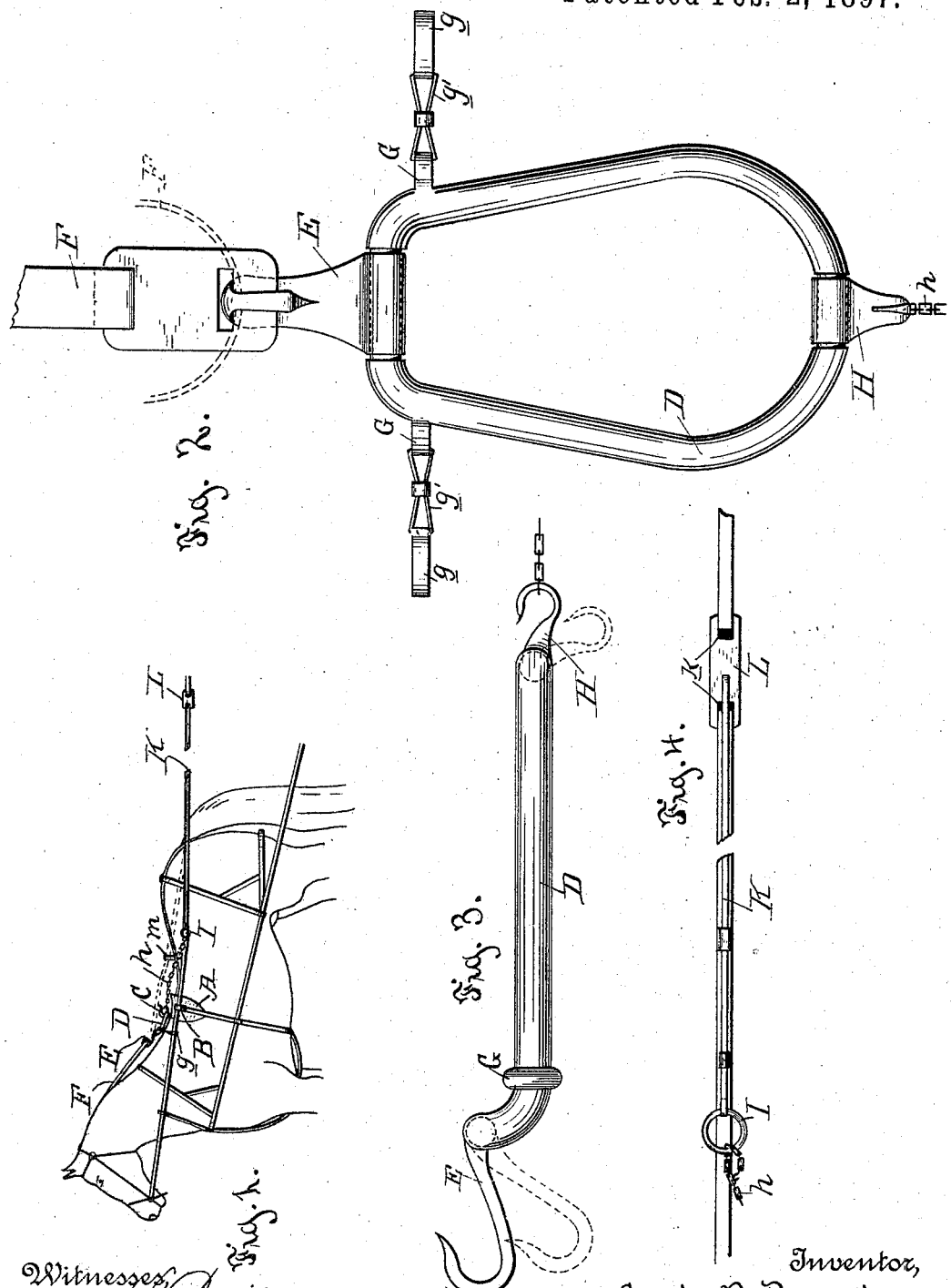

LOUIS E. FOURNIER, OF EVANSVILLE, INDIANA.

CHECKING OR UNCHECKING DEVICE.

SPECIFICATION forming part of Letters Patent No. 576,306, dated February 2, 1897.

Application filed December 1, 1896. Serial No. 614,041. (No model.)

*To all whom it may concern:*

Be it known that I, LOUIS E. FOURNIER, a citizen of the United States, residing at Evansville, in the county of Vanderburg and State of Indiana, have invented certain new and useful Improvements in Checking or Unchecking Devices; and I do hereby declare the following to be a full, clear, and exact description of the invention, such as will enable others skilled in the art to which it appertains to make and use the same.

This invention relates to an improvement in checking and unchecking devices; and it consists in the construction and arrangement of parts hereinafter described, and definitely pointed out in the claims.

The invention relates to that class of devices by the use of which a horse can be unchecked or checked by the occupant of a vehicle without getting out of the vehicle. The special object of the invention is to provide a simple and easily-operated device applicable to the usual style of harness.

The advantages of the invention I shall state more fully hereinafter in connection with the description of the preferred form of device illustrated in the accompanying drawings.

In the drawings like letters of reference designate corresponding parts in the several views.

Figure 1 is an elevation of the device properly applied. Fig. 2 is an enlarged plan. Fig. 3 is an enlarged side elevation, and Fig. 4 is an elevation of a section of a driving-rein with the adjusting-strap for the checking and unchecking device.

In the drawings, A designates the harness-saddle, B the terrets, and C the checkrein-hook.

D designates an open oblong frame, preferably of metal, and of a length and width sufficient to permit the check-hook to easily pass therethrough. This frame has its forward end bent or curved upward, so that it will escape the mane of the horse as the frame is moved forward. At the end of the frame is secured, preferably through a pivotal connection, a hook E, over which the checkrein F is placed, the same being adapted to receive either an over or side check.

G designates side loops at or near the forward end of the side bars of the frame, to which suitable guide-rings g are secured by the strap g'.

On the rear of the frame is pivotally secured a hook H, which has attached thereto a flexible connecting member h, conveniently a chain, which passes to and is adjustably or in other ways secured to a ring I, carried by a strap K of a length to extend back within reach of the driver. The rear end of the strap K is secured to a plate L of any suitable material, and preferably at the center thereof. The plate has two slots k, one at each end, through which the driving-rein is passed.

The two reins are first passed through the terrets and then through the rings g, thereby serving to guide or maintain the frame in its proper position relative to the check-hook.

One of the reins, by being passed through the plate L, is thus passed through the ring at the forward end of the strap K and serves thereby as a support for the strap.

When it is desired, the chain h can be readily lengthened or shortened to adjust the device or vary the distance from the vehicle to this strap.

In operation the driver reaches forward, (assuming that the horse has been checked,) grasps the guide-plate, or he may grasp the strap K, as desired, drawing the same back until the frame is free from the check-hook of the saddle. The frame is then slightly elevated to escape the hook and the act of unchecking is complete. To recheck, the strap is drawn back until the frame is above the check-hook and then allowed to descend and embrace the hook. During these operations the frame is properly guided by the reins, while the adjusting-strap is practically carried by one of the reins.

I am aware that many minor changes can be made in the construction shown without departing from the nature and principle of my invention.

In Fig. 1 I have shown a ring m, attached to the back-strap. This ring is to be used in connection with a high overcheck, the chain being passed through the ring. As the frame is drawn back the chain engages the ring and holds the frame in the proper plane for engagement with the check-hook.

Having thus described my invention, what is claimed as new, and desired to be secured by Letters Patent, is—

1. In a checking and unchecking device, the combination with the saddle and its check-hook, of an open frame having an attaching device at its forward end, guide-rings secured to the sides of the frame, an actuating-strap secured to the rear of the frame extending rearward, and means for supporting the strap on a rein, substantially as described.

2. In a checking and unchecking device, the combination with a saddle, of an open oblong frame located above the saddle, an attaching device at the forward end of the frame, guides secured at the sides of the frame through which the reins pass, a strap connected to the rear of the frame, and a connection between the strap and one of the reins, substantially as described.

3. A checking and unchecking device, consisting of an open frame having a securing device at its forward end, and guides at its sides, an actuating-strap, an adjustable connection between the same and frame, and means for securing the strap to a rein, substantially as described.

4. The combination with the open oblong frame having an upturned forward end and a securing device at the end, guide-rings on the sides of the frame, an attaching device on the rear of the frame, an actuating-strap, a ring secured to the forward end thereof, a connection between the ring and rear attaching device, and a slotted plate on the rear of the strap, substantially as described.

In testimony whereof I affix my signature in presence of two witnesses.

LOUIS E. FOURNIER.

Witnesses:
H. W. LAUER,
CHAS. F. KERTH.